United States Patent
Thomas et al.

(10) Patent No.: US 11,576,182 B2
(45) Date of Patent: Feb. 7, 2023

(54) SYSTEMS AND METHODS FOR DYNAMIC SELECTION OF A PHYSICAL UPLINK CONTROL CHANNEL FORMAT

(71) Applicant: Verizon Patent and Licensing Inc., Basking Ridge, NJ (US)

(72) Inventors: Mathew Thomas, Madison, NJ (US); Sachin Vargantwar, Cumming, GA (US); Maulik Shah, Carrollton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 17/184,180

(22) Filed: Feb. 24, 2021

(65) Prior Publication Data

US 2022/0272707 A1 Aug. 25, 2022

(51) Int. Cl.
*H04W 72/04* (2009.01)
*H04W 72/08* (2009.01)
*H04L 1/20* (2006.01)
*H04L 1/00* (2006.01)
*H04W 28/04* (2009.01)

(52) U.S. Cl.
CPC ....... *H04W 72/0486* (2013.01); *H04L 1/0006* (2013.01); *H04L 1/203* (2013.01); *H04W 28/04* (2013.01); *H04W 72/0413* (2013.01); *H04W 72/087* (2013.01)

(58) Field of Classification Search
None
See application file for complete search history.

(56) References Cited

U.S. PATENT DOCUMENTS

| | | | |
|---|---|---|---|
| 2015/0092702 A1* | 4/2015 | Chen | H04L 5/0053 370/329 |
| 2016/0338041 A1* | 11/2016 | Li | H04L 5/001 |
| 2020/0221444 A1* | 7/2020 | Tiirola | H04W 72/0413 |
| 2021/0091838 A1* | 3/2021 | Bai | H04L 5/0091 |
| 2021/0314046 A1* | 10/2021 | Kim | H04B 7/0456 |
| 2022/0124756 A1* | 4/2022 | Taherzadeh Boroujeni | H04W 72/1284 |

* cited by examiner

*Primary Examiner* — Saumit Shah

(57) ABSTRACT

A base station may receive uplink data identifying uplink performance indicators associated with user equipment connected to the base station, and may receive tuning factors associated with shared channel traffic received by the user equipment and quality of service requirements of the user equipment. The base station may determine a total score associated with utilizing a long duration physical uplink control channel (PUCCH) format for uplink control information based on the uplink data and the tuning factors. The base station may determine that the total score satisfies a threshold score and may switch to the long duration PUCCH format for the uplink control information based on the total score satisfying the threshold score. The base station may perform one or more actions based on switching to the long duration PUCCH format for the uplink control information.

20 Claims, 12 Drawing Sheets

| Short Duration PUCCH Format | Length (symbols) | Quantity of UCI bits | Quantity of PRBs |
|---|---|---|---|
| First | 1 - 2 | 1, 2 | 1 |
| Second | 1 - 2 | > 2 | 1 - 16 |

145 — First row
150 — Second row

FIG. 1E

| Long Duration PUCCH Format | Length (symbols) | Quantity of UCI bits | Quantity of PRBs |
|---|---|---|---|
| First | 4 - 14 | 1, 2 | 1 |
| Second | 4 - 14 | > 2 | 1 – 6, 8 – 10, 12, 15, 16 |
| Third | 4 - 14 | > 2 | 1 |

160 — First row
165 — Second row
170 — Third row

FIG. 1G

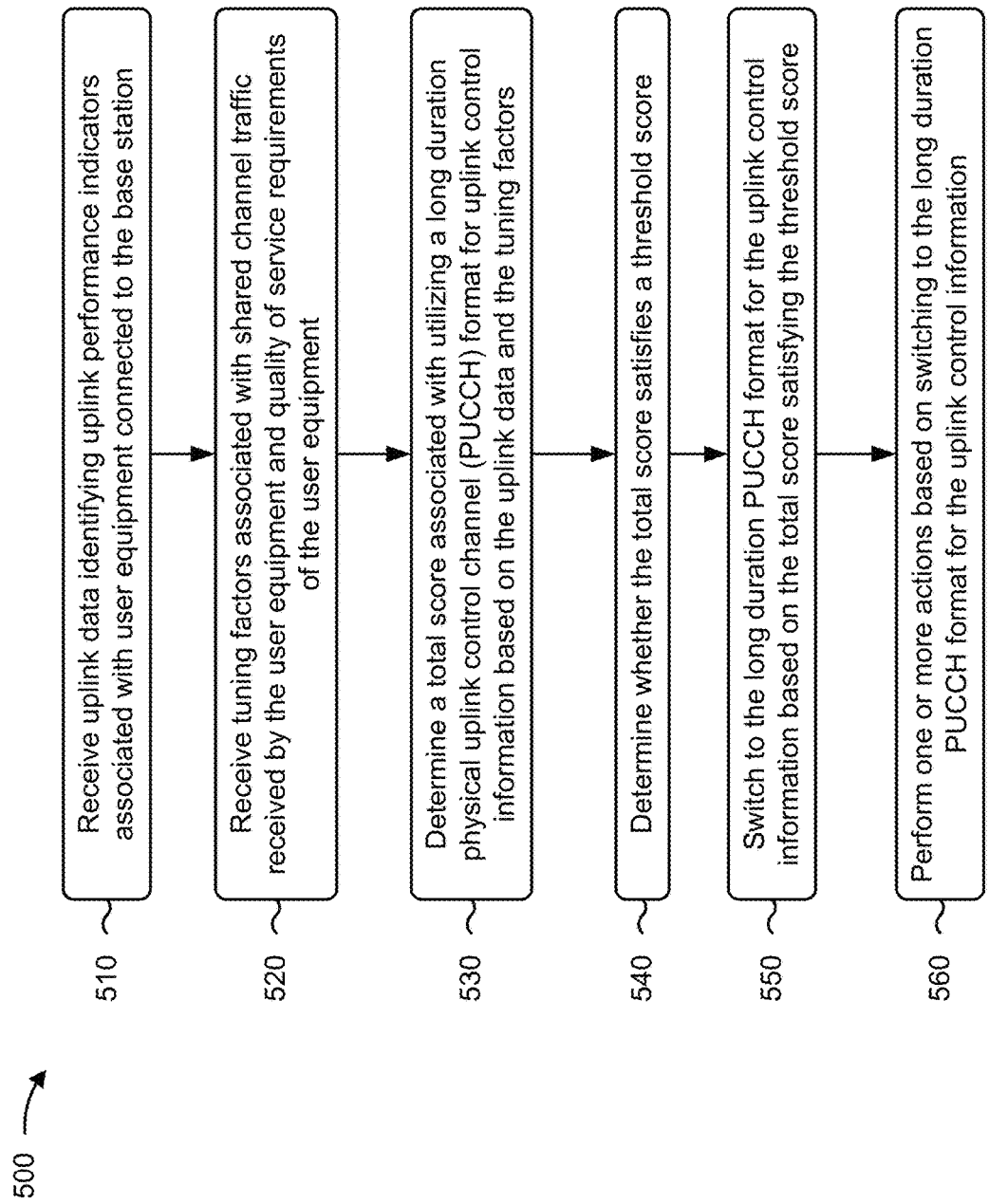

SYSTEMS AND METHODS FOR DYNAMIC SELECTION OF A PHYSICAL UPLINK CONTROL CHANNEL FORMAT

BACKGROUND

A base station (e.g., an eNodeB, a gNodeB, and/or the like) is a hardware component that connects a core network to an end user mobile device (e.g., a user equipment or UE). A base station sends and receives wireless radio transmissions to and from UEs, and controls low-level operation of UEs connected to the base station via a radio access network (RAN).

BRIEF DESCRIPTION OF THE DRAWINGS

FIGS. 1A-1H are diagrams of an example associated with dynamic selection of a physical uplink control channel format.

FIG. 5 is a flowchart of an example process relating to dynamic selection of a physical uplink control channel format.

DETAILED DESCRIPTION OF PREFERRED EMBODIMENTS

Figure 1A:
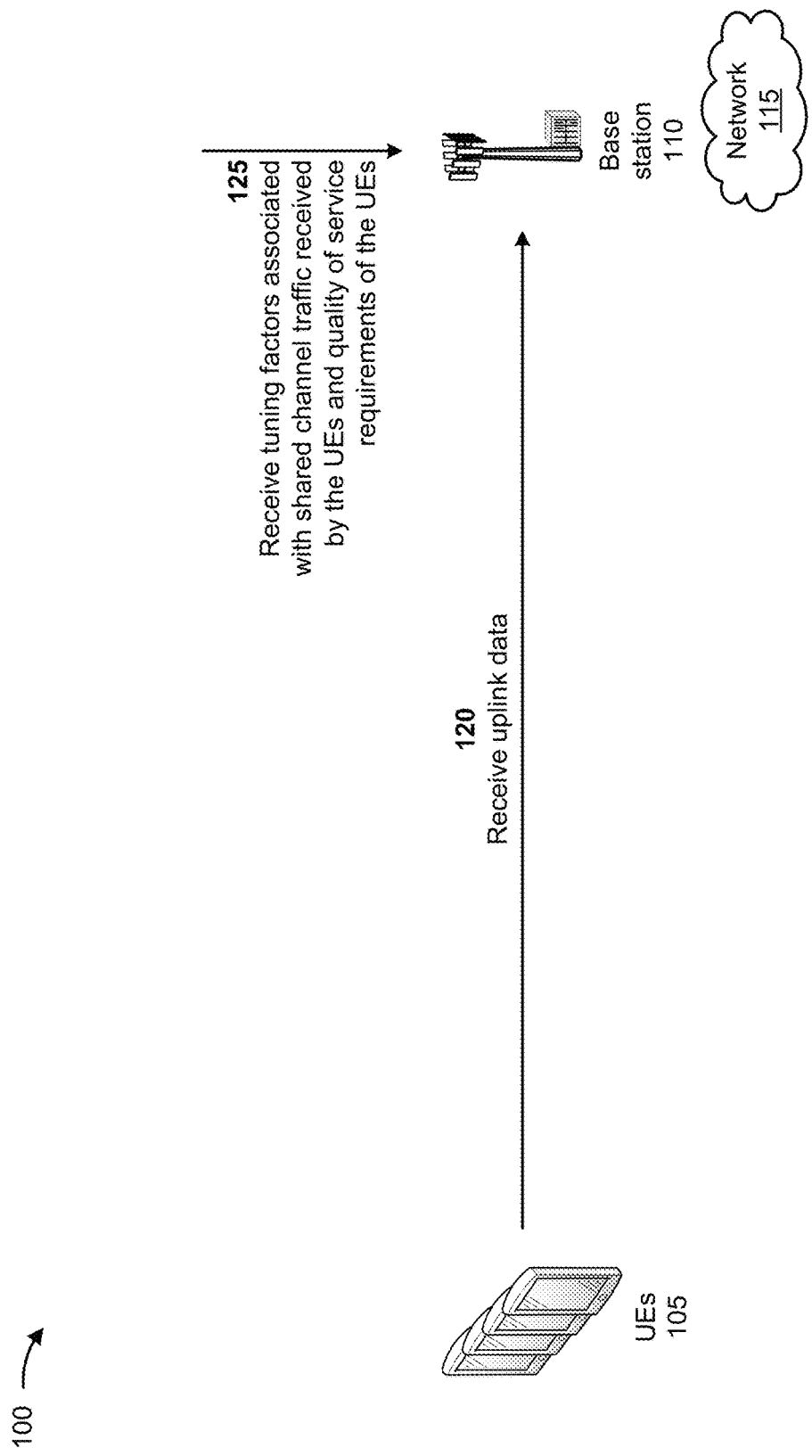

The following detailed description of example implementations refers to the accompanying drawings. The same reference numbers in different drawings may identify the same or similar elements.

A physical uplink control channel (PUCCH) is an uplink physical channel that carries uplink control information (UCI) from UEs to a base station. Performance of the PUCCH has a strong correlation on both downlink and uplink performance for UEs. There are two types of PUCCH formats, a short duration PUCCH format and a long duration PUCCH format, and a total of five different PUCCH formats, two short duration PUCCH formats and three long duration PUCCH formats currently defined in the standards. The format of the PUCCH is determined based on a quantity of bits of UCI to be carried and a quantity of assigned symbols.

For example, a first short duration PUCCH format is assigned one to two symbols and one or two uplink control information (UCI) bits. The first PUCCH format may have one physical resource block (PRB). A second short duration PUCCH format is assigned one to two symbols and three or more UCI bits. The second short duration PUCCH format may have one to sixteen PRBs. A first long duration PUCCH format is assigned four to fourteen symbols and one or two UCI bits. The first long duration PUCCH format may have one PRB. A second long duration PUCCH format is assigned four to fourteen symbols and three or more UCI bits. The second long duration PUCCH format may have one to six PRBs, eight to ten PRBs, twelve PRBs, fifteen PRBs, or sixteen PRBs. A third long duration PUCCH format is assigned four to fourteen symbols and three or more UCI bits. The third long duration PUCCH format may have one PRB.

Current standards allow for different options for the PUCCH format, such as symbols assigned, a quantity of UCI bits, and a quantity of physical resource blocks (PRBs). Utilizing the long duration PUCCH format may improve performance of the uplink physical channel under various operating conditions or scenarios. However, utilizing the long duration PUCCH format results in a reduced number of PRBs available for the uplink physical channel relative to utilizing the short duration PUCCH formats. Further, base stations currently employ static PUCCH formats that apply to all UEs operating in a coverage area of the base station. Thus, utilizing the long duration PUCCH format during periods of high traffic on the uplink physical channel, and, therefore, having a reduced number of PRBs available for the uplink physical channel, reduces an amount of uplink traffic that can be transmitted via the uplink physical channel. Additionally, utilizing the short duration PUCCH format during periods of reduced traffic on the uplink physical channel causes an increase in an error rate associated with the UEs relative to utilizing the long duration PUCCH format. Thus, current techniques for utilizing the format of the PUCCH to control performance of base stations waste computing resources (e.g., processing resources, memory resources, communication resources, and/or the like), networking resources, and/or the like associated with inefficient downlink and uplink performance for UEs, base stations operating inefficiently, attempting to correct inefficient downlink and uplink performance for UEs, attempting to correct the base stations operating inefficiently, and/or the like.

Some implementations described herein provide a base station that performs dynamic selection of a PUCCH format. For example, the base station may receive uplink data identifying uplink performance indicators associated with user equipment connected to the base station and tuning factors associated with shared channel traffic received by the user equipment and quality of service requirements of the user equipment. The base station may determine a total score associated with utilizing a long duration PUCCH format for uplink control information based on the uplink data and the tuning factors. The base station may determine whether the total score satisfies a threshold score and may switch to the long duration PUCCH format for the uplink control information when the total score satisfies the threshold score.

In this way, the base station performs dynamic selection of a PUCCH format. The base station may utilize a long duration PUCCH format, which improves uplink performance (e.g., feedback for downlink information coming from the uplink, reduced error rate, and/or the like), based on an amount of traffic transmitted via a physical uplink shared channel (PUSCH), quality of service (QoS) requirements of the UEs connected to the base station, and/or performance parameters associated with the base station. The long duration PUCCH format may be applied to all UEs in a serving area of the base station or may be selectively applied to one or more UEs based on one or more characteristics of the UEs (e.g., an ability to utilize the long duration PUCCH format, a distance between the UE and the base station, and/or the like). Thus, the base station conserves computing resources, networking resources, and/or the like associated with inefficient downlink and uplink performance for UEs, the base station operating inefficiently, attempting to correct inefficient downlink and uplink performance for UEs, attempting to correct the base station operating inefficiently, and/or the like resulting from using a static PUCCH format that applies to all UEs in the serving area of the base station.

FIGS. 1A-1H are diagrams of an example 100 associated with dynamic selection of a PUCCH format. As shown in FIGS. 1A-1H, example 100 includes user equipment (UEs) 105 associated with a base station 110 and a network 115. Each of UEs 105 may include a wireless communication device, a mobile phone, a laptop computer, a tablet computer, a desktop computer, and/or the like. Each base station 110 may include an eNodeB (eNB) capable of transferring traffic, such as audio, video, text, and/or other traffic associated with network 115, a gNodeB (gNB) that supports, for example, a cellular radio access technology (RAT) and wireless communication for network 115, and/or the like. Network 115 may include a RAN associated with a long-term evolution (LTE) or fourth generation (4G) network, a new radio (NR) or fifth generation (5G) network, and/or the like.

As shown in FIG. 1A, and by reference number 120, base station 110 receives uplink data from UEs 105. The uplink data may identify uplink performance indicators associated with UEs 105. For example, the uplink data may include information identifying an error rate associated with UEs 105, a quantity of UEs 105 with errors, a mobility rate associated with UEs 105 (e.g., a rate at which a UE 105 travels through a coverage area of base station 110, a quantity of handover operations performed by base station 110 over a time period, and/or the like), and/or another type of uplink performance indicator associated with UEs 105. Base station 110 may receive the uplink data periodically, based on transmitting a request to the UEs 105, based on an occurrence of an event (e.g., a UE 105 establishing a connection with base station 110), and/or the like.

As shown by reference number 125, base station 110 receives tuning factors associated with shared channel traffic associated with UEs 105 and quality of service (QoS) requirements of the UEs 105. The tuning factors may include one or more factors (e.g., PUSCH traffic volume, a signal-to-noise ratio associated with base station 110, a distance between a location of a UE 105 and base station 110, and/or the like) associated with influencing a rate at which base station 110 transitions to a long duration PUCCH format for uplink control information. As an example, the tuning factors may influence (e.g., contribute to a larger total score, as described in greater detail below) base station 110 to utilize the long duration PUCCH format for uplink control information when PUSCH traffic volume satisfies a PUSCH traffic volume threshold and may influence base station 110 to utilize the short duration PUCCH format for uplink control information when PUSCH traffic volume fails to satisfy the PUSCH traffic volume threshold.

The QoS requirements may comprise requirements for aspects of a connection such as service response time, loss, signal-to-noise ratio, crosstalk, echo, interrupts, frequency response, loudness levels, and/or the like. Alternatively, and/or additionally, the QoS requirements may comprise aspects of a connection relating to capacity and coverage of network 115, such as guaranteed maximum blocking probability, outage probability, and/or the like.

Figure 1B:
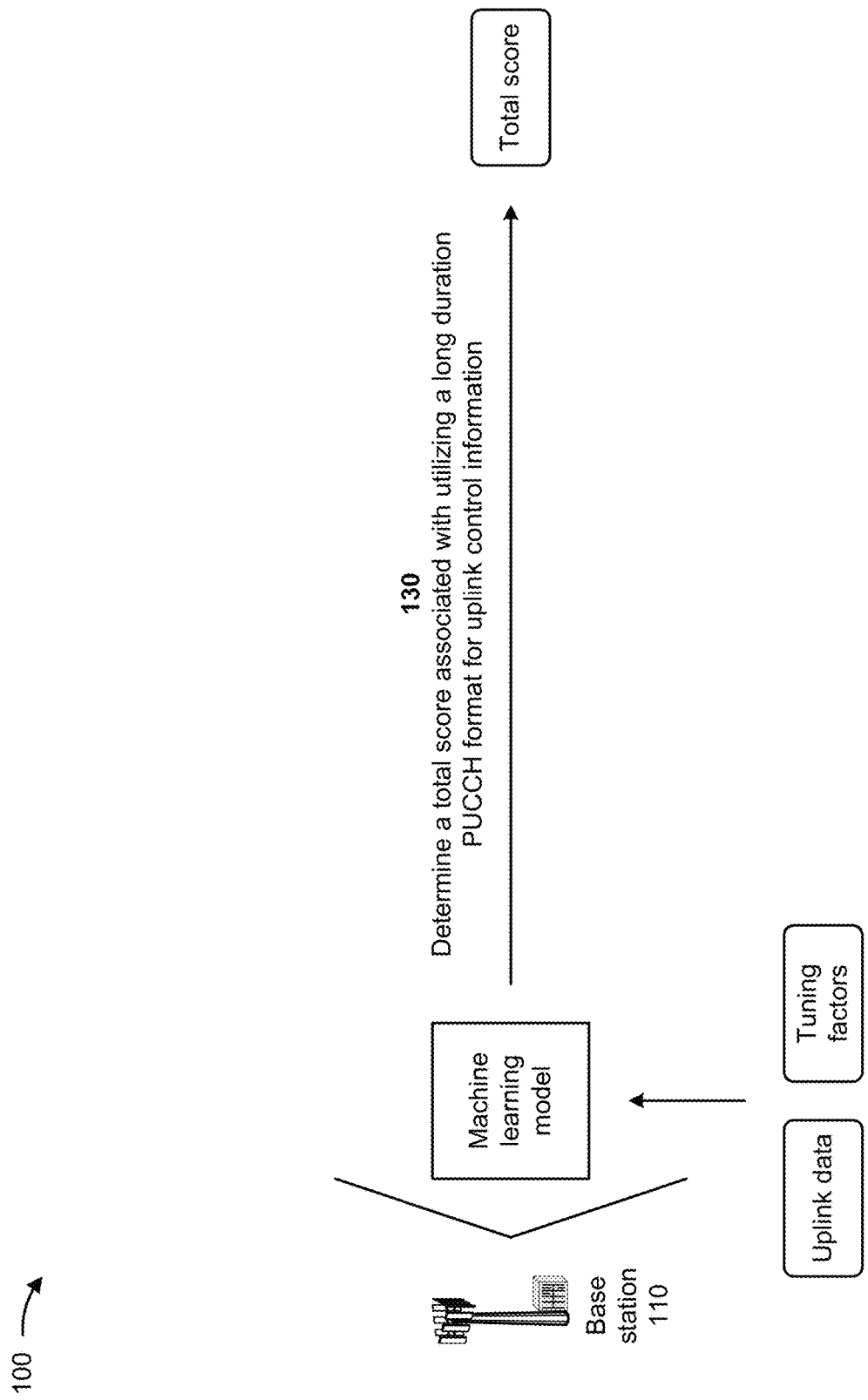

As shown in FIG. 1B, and by reference number 130, base station 110 determines a total score associated with utilizing a long duration PUCCH format for uplink control information. In some implementations, base station 110 determines the total score based on the uplink data and the tuning factors. Base station 110 may assign scores to the uplink performance indicators and/or the tuning factors to generate a plurality of scores. Base station 110 may apply weights to the plurality of scores to generate a plurality of weighted scores. In some implementations, base station 110 applies the weights to the plurality of scores based on the tuning factors. For example, the tuning factors may indicate that a first weight is to be applied to a score associated with PUSCH traffic volume when PUSCH traffic volume satisfies a PUSCH traffic volume criteria (e.g., satisfying a threshold, crossing a threshold, and/or the like) and that a second, different weight is to be applied to the score when the PUSCH traffic volume fails to satisfy the PUSCH traffic volume threshold. Base station 110 may combine the plurality of weighted scores to determine the total score.

In some implementations, as shown in FIG. 1B, base station 110 utilizes a machine learning model (e.g., a decision tree machine learning model) to determine the total score. For example, base station 110 may provide the uplink data and the tuning factors as an input to the machine learning model. The machine learning model may process the uplink data and the tuning factors to generate an output. The output may indicate the total score and a confidence score that reflects a measure of confidence that the total score is accurate.

In some implementations, base station 110 trains the machine learning model based on historical uplink data and/or historical tuning factors. For example, base station 110 may train the machine learning model in a manner similar to that described below with respect to FIG. 2. Alternatively, and/or additionally, base station 110 may obtain a trained machine learning model from another device (e.g., another base station, a server device, and/or the like).

Figure 1C:
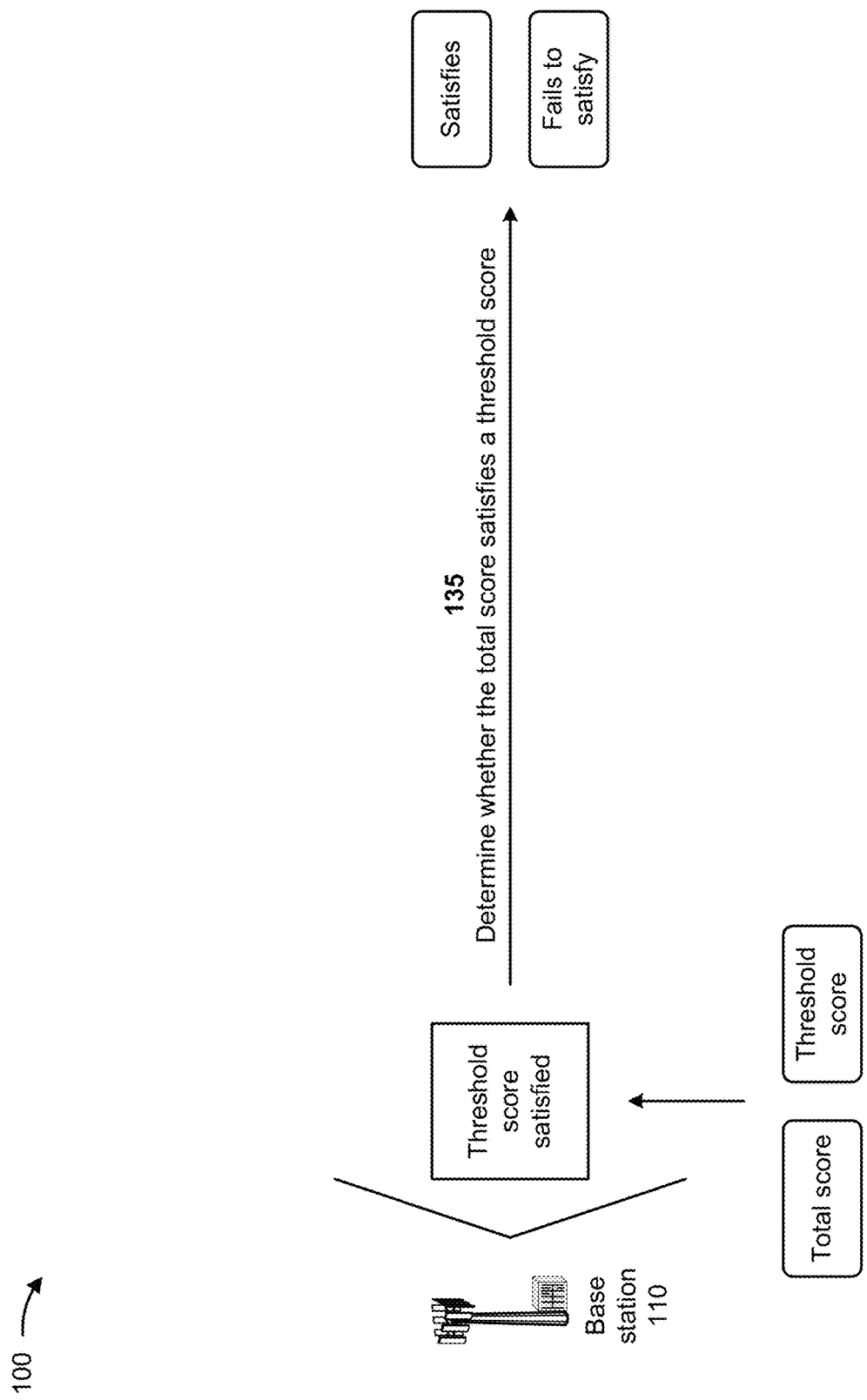

In some implementations, base station 110 determines whether the total score satisfies one or more criteria. For example, as shown in FIG. 1C, and by reference number 135, base station 110 determines whether the total score satisfies a threshold score.

Figure 1D:
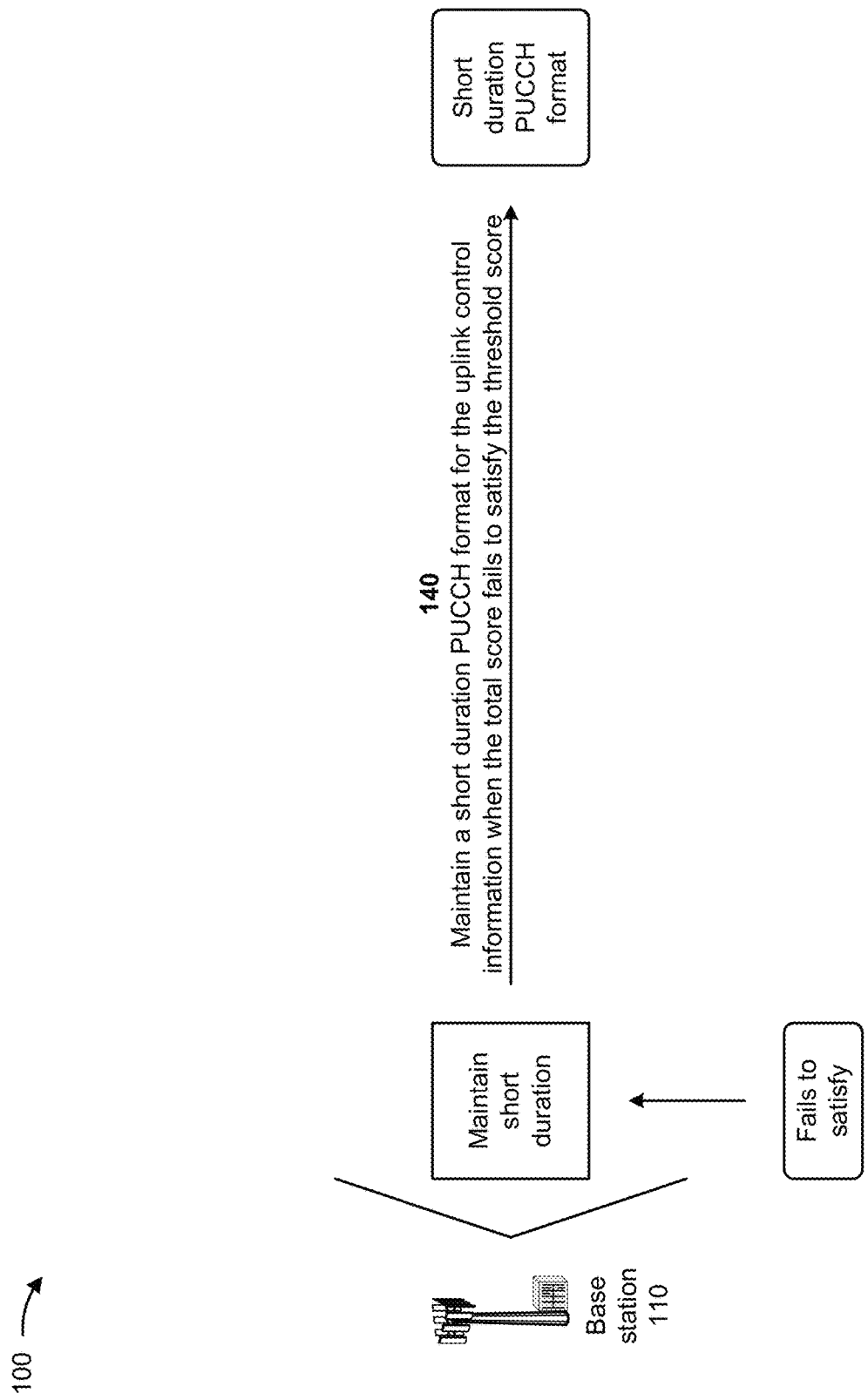

In some implementations, base station 110 determines that the total score fails to satisfy the threshold score. For example, base station 110 may determine that the total score does not equal or exceed the threshold score. As shown in FIG. 1D, and by reference number 140, base station 110 maintains a short duration PUCCH format for the uplink control information when the total score fails to satisfy the threshold score.

In some implementations, the short duration PUCCH format is associated with a plurality of formats. For example, as shown in FIG. 1E, the short duration PUCCH format may be associated with a first short duration PUCCH format and a second short duration PUCCH format. As shown by reference number 145, the first short duration PUCCH format may include one or two bits of the uplink control information, have a length in a range of one symbol or two symbols, and may utilize one physical resource block. As shown by reference number 150, the second short duration PUCCH format may include more than two bits of the uplink control information, have a length in a range of one symbol or two symbols, and may utilize between one to sixteen physical resource blocks.

Figure 1F:
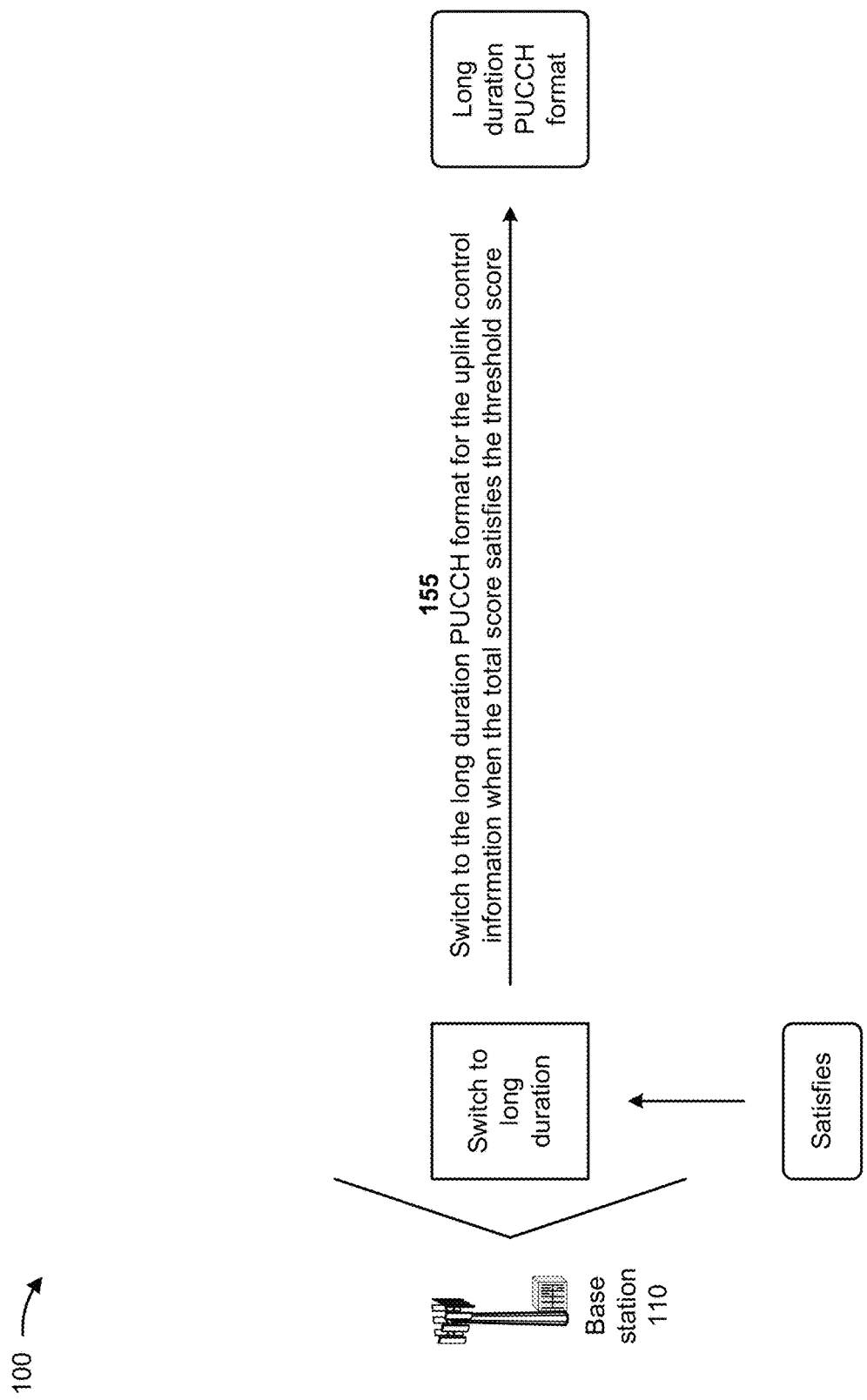

In some implementations, base station 110 determines that the total score satisfies the threshold score. For example, base station 110 may determine that the total score equals or exceeds the threshold score. As shown in FIG. 1F, and by reference number 155, base station 110 switches to the long duration PUCCH format for the uplink control information when the total score satisfies the threshold score.

In some implementations, the long duration PUCCH format is associated with a plurality of formats. For example, as shown in FIG. 1G, the long duration PUCCH format may be associated with a first format, a second format, and a third format. As shown by reference number 160, the first format may include one or two bits of the uplink control information, have a length in a range of four symbols through fourteen symbols, and may utilize one physical resource block. As shown by reference number 165, the second format may include more than two bits of the uplink control information, have a length in a range of four symbols through fourteen symbols, and may utilize one to six physical resource blocks, eight to ten physical resource blocks, twelve physical resource blocks, fifteen physical resource blocks, or sixteen physical resource blocks. As shown by reference number 170, the third format may include more than two bits of the uplink control information, have a length in a range of four symbols through fourteen symbols, and may utilize one physical resource block.

Base station 110 may select the long duration format from the plurality of formats based on the PUSCH traffic volume, the QoS requirements, the uplink data, the tuning factors, and/or the like. For example, base station 110 may select the long duration format when a volume of PUSCH traffic is less than a PUSCH traffic volume criteria.

Figure 1H:
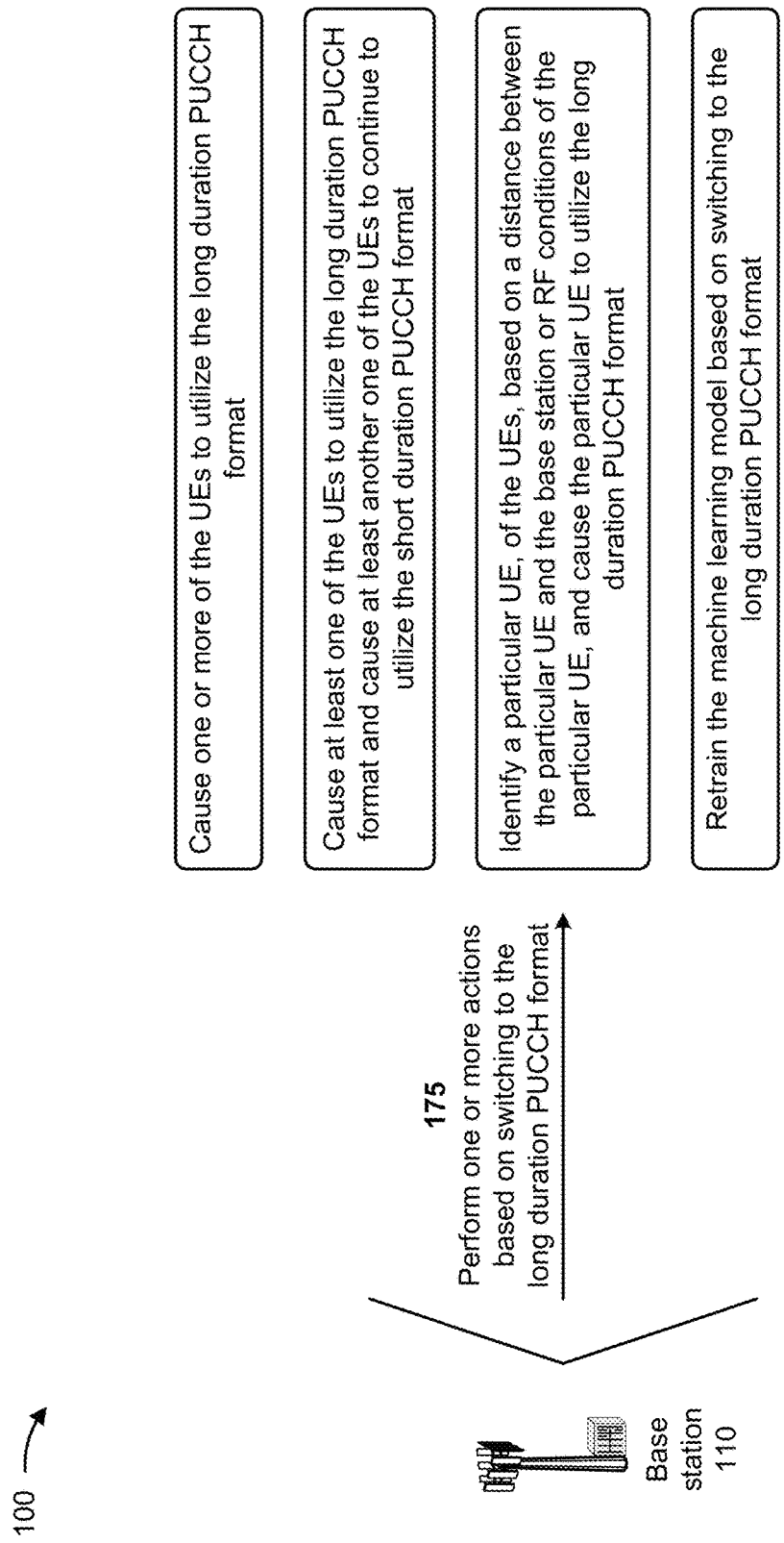

As shown in FIG. 1H, and by reference number 175, base station 110 may perform one or more actions based on switching to the long duration PUCCH format for the uplink control information. In some implementations, the one or more actions include base station 110 causing one or more of UEs 105 to utilize the long duration PUCCH format for the uplink control information. For example, base station 110 may broadcast control information indicating that one or more of UEs 105 are to utilize the long duration PUCCH for the uplink control information.

In some implementations, the one or more actions include base station 110 causing at least one of the UEs 105 to utilize the long duration PUCCH format and causing at another one of the UEs 105 to continue utilizing the short duration PUCCH format. Base station 110 may cause a first UE 105 to utilize the long duration PUCCH format based on the first UE 105 being able to utilize the long duration PUCCH format, a distance the first UE 105 is from base station 110 (e.g., based on a distance between the first UE 105 and base station 110 satisfying a first distance threshold), RF conditions associated with the first UE 105, a service type associated with the first UE 105, an application associated with the first UE 105 (e.g., an enhanced mobile broadband (eMBB) application), and/or the like. Base station 110 may cause the second UE 105 to continue utilizing the short duration PUCCH format based on the second UE 105 being unable to utilize the long duration PUCCH format, a distance the second UE 105 is from base station 110 (e.g., a distance between the second UE 105 and base station 110 satisfying a second distance threshold and/or failing to satisfy the first distance threshold), RF conditions associated with the second UE 105, a service type associated with the second UE 105, second an application associated with the first UE 105 (e.g., a low latency type of application (e.g., voice)), and/or the like.

In some implementations, the one or more actions include base station 110 identifying a particular UE 105 based on a distance between the particular UE 105 and base station 110 and/or RF conditions associated with the particular UE 105 and causing the particular UE 105 to utilize the long duration PUCCH format. For example, base station 110 may determine the distance between a particular UE 105 and base station 110 based on a signal strength associated with the particular UE 105. Base station 110 may determine that the distance satisfies a threshold distance by, for example, comparing the distance to the threshold distance. Base station 110 may cause the particular UE 105 to utilize the long duration PUCCH format based on the distance satisfying the threshold distance.

In some implementations, the one or more actions include base station 110 retraining the machine learning model based on switching to the long duration PUCCH format. Base station 110 may obtain additional uplink data from one or more UEs 105 utilizing the long duration PUCCH format. Base station 110 may utilize the additional uplink as additional training data for retraining the machine learning model thereby increasing the quantity of training data available for training the machine learning model. Accordingly, base station 110 may conserve computing resources associated with identifying, obtaining, and/or generating historical data for training the machine learning model relative to other systems for identifying, obtaining, and/or generating historical data for training machine learning models.

In this way, base station 110 performs dynamic selection of a PUCCH format. Base station 110 may utilize a long duration PUCCH format, which improves uplink performance (e.g., feedback for downlink information coming from the uplink, reduced error rate, and/or the like), based on an amount of traffic transmitted via a PUSCH, QoS requirements of UEs 105 connected to base station 110, and/or performance parameters associated with base station 110. The long duration PUCCH format may be applied to all UEs 105 in a serving area of base station 110 or may be selectively applied to one or more UEs 105 based on one or more characteristics of the UEs 105 (e.g., an ability to utilize the long duration PUCCH format, a distance between UEs 105 and base station 110, and/or the like). Thus, base station 110 conserves computing resources, networking resources, and/or the like associated with inefficient downlink and uplink performance for UEs 105, base station 110 operating inefficiently, attempting to correct inefficient downlink and uplink performance for UEs 105, attempting to correct base station 110 operating inefficiently, and/or the like resulting from using a static PUCCH format that applies to all UEs 105 in the serving area of base station 110.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
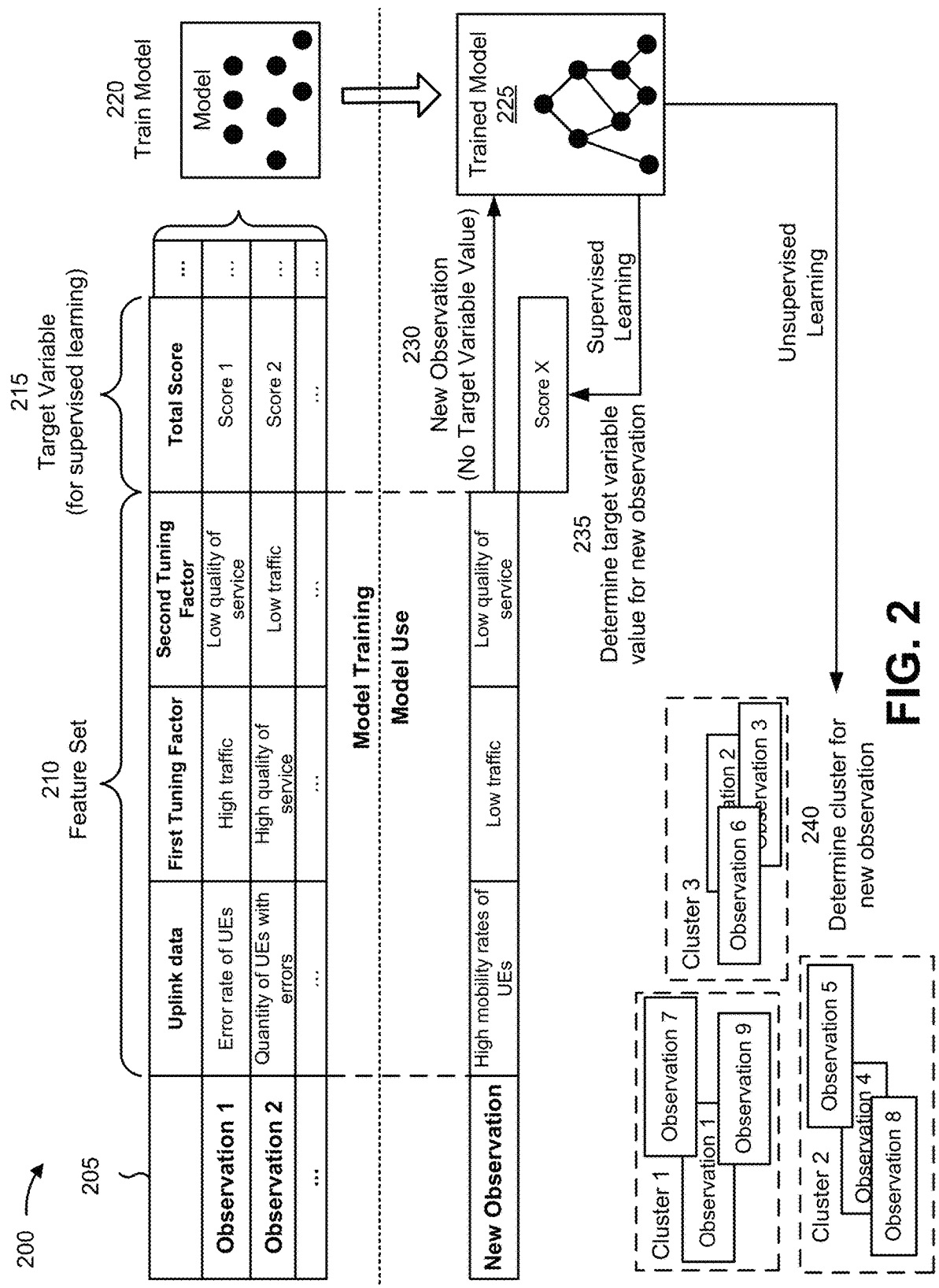
FIG. 2 is a diagram illustrating an example of training and using a machine learning model in connection with dynamic selection of a physical uplink control channel format.

FIG. 2 is a diagram illustrating an example 200 of training and using a machine learning model in connection with dynamic selection of a PUCCH format. The machine learning model training and usage described herein may be performed using a machine learning system. The machine learning system may include or may be included in a computing device, a server, a cloud computing environment, or the like, such as base station 110 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from UEs 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from UEs 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of uplink data, a second feature of a first tuning factor, a third feature of a second tuning factor, and so on. As shown, for a first observation, the first feature may have a value of an error rate of UEs 105, the second feature may have a value of high traffic, the third feature may have a value of low quality of service, and so on. These features and feature values are provided as examples, and may differ in other examples. For example, the feature set may include one or more of the following features: the uplink performance indicators and the tuning factors described above in connection with FIG. 1A.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a total score, which has a value of score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of high mobility rates of UEs 105, a second feature of low traffic, a third feature of low quality of service, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of score X for the target variable of total score for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, determining that score X satisfies a score threshold. The first automated action may include, for example, causing one or more of UEs 105 to utilize a long duration PUCCH format.

As another example, if the machine learning system were to predict score X for the target variable of total score, then the machine learning system may provide a second (e.g., different) recommendation (e.g., score X fails to satisfy the score threshold) and/or may perform or cause performance of a second (e.g., different) automated action (e.g., maintain the short duration PUCCH format).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an uplink data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a first tuning factor cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified. The recommendations, actions, and clusters described above are provided as examples, and other examples may differ from what is described above.

In this way, the machine learning system may apply a rigorous and automated process for dynamic selection of a PUCCH format. The machine learning system enables recognition and/or identification of tens, hundreds, thousands, or millions of features and/or feature values for tens, hundreds, thousands, or millions of observations, thereby increasing accuracy and consistency and reducing delay associated with dynamic selection of a PUCCH format relative to requiring computing resources to be allocated for tens, hundreds, or thousands of operators to manually select a PUCCH format using the features or feature values.

As indicated above, FIG. 2 is provided as an example. Other examples may differ from what is described in connection with FIG. 2.

Figure 3:
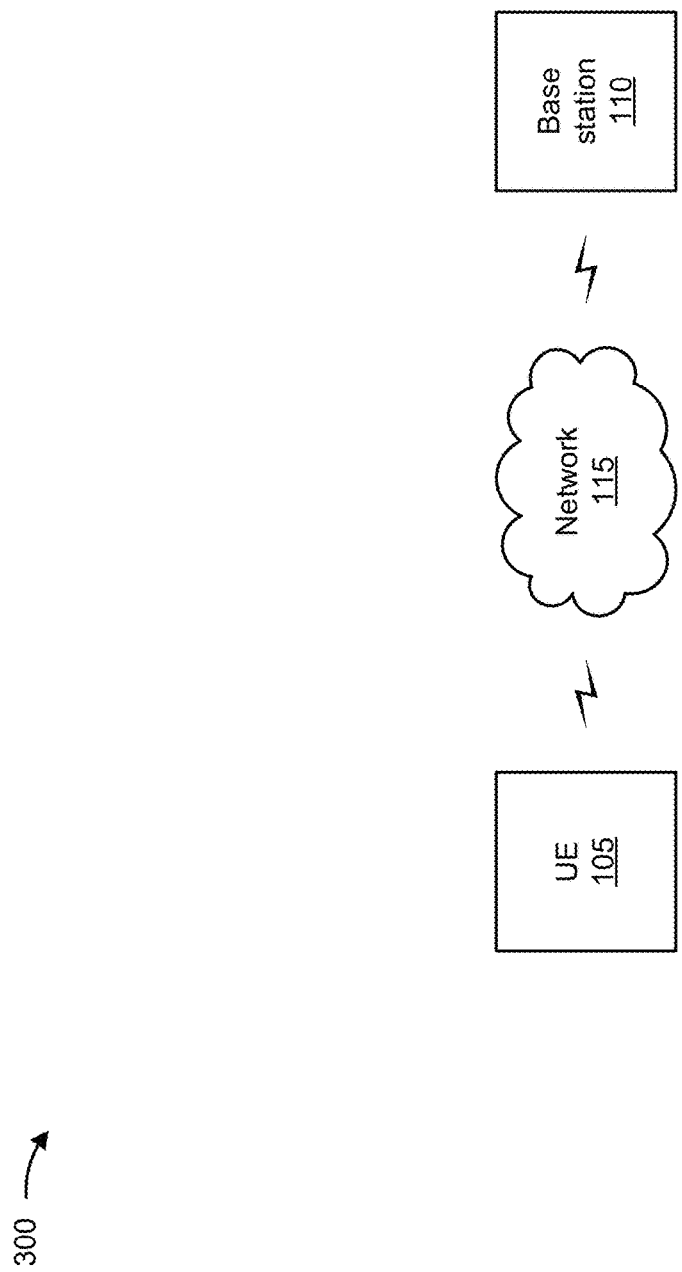
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include UE 105, base station 110, and network 115. Devices and/or elements of environment 300 may interconnect via wired connections and/or wireless connections.

UE 105 includes one or more devices capable of receiving, generating, storing, processing, and/or providing information, as described elsewhere herein. UE 105 may include a communication device and/or a computing device. For example, UE 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Base station 110 includes one or more devices capable of transferring traffic, such as audio, video, text, and/or other traffic, destined for and/or received from UE 105. For example, base station 110 may include an eNB associated with an LTE network that receives traffic from and/or sends traffic to a core network, a gNB associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

Network 115 may include a RAN that includes one or more base stations 110 that take the form of eNBs, gNBs, and/or the like, via which a user device (e.g., a mobile phone, a laptop computer, a tablet computer, a desktop computer, and/or the like) communicates with a core network. Network 115 may include one or more wired and/or wireless networks. For example, network 115 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
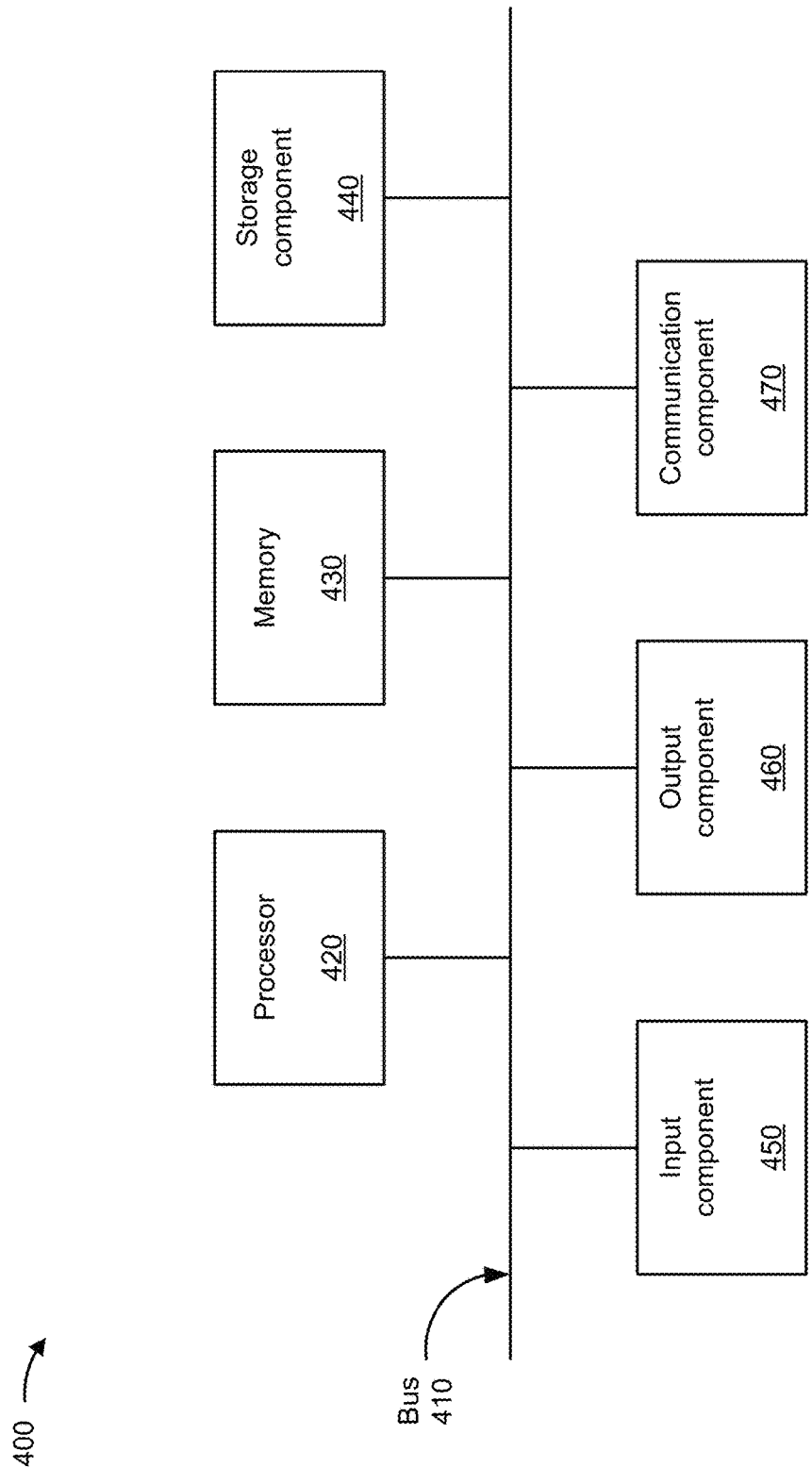
FIG. 4 is a diagram of example components of one or more devices of FIG. 3.

FIG. 4 is a diagram of example components of a device 400, which may correspond to UE 105 and/or base station 110. In some implementations, UE 105 and/or base station 110 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hard-wired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with dynamic selection of a PUCCH format. In some implementations, one or more process blocks of FIG. 5 may be performed by a base station (e.g., base station 110). In some implementations, one or more process blocks of FIG. 5 may be performed by another device or a group of devices separate from or including the base station, such as a UE (e.g., UE 105). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving uplink data identifying uplink performance indicators associated with UE connected to the base station (block 510). For example, the base station may receive uplink data identifying uplink performance indicators associated with UE connected to the base station, as described above. The base station may include an eNodeB and/or a gNodeB. The uplink performance indicators may include error rates associated with the UE, a quantity of the UE associated with errors, a quantity of the UE with high mobility rates, and/or the like.

As further shown in FIG. 5, process 500 may include receiving tuning factors associated with shared channel traffic received by the UE and QoS requirements of the UE (block 520). For example, the base station may receive tuning factors associated with shared channel traffic received by the UE and QoS requirements of the UE, as described above. The tuning factors may be further associated with distances between the UE and the base station, RF conditions of the UE, service types of the UE, applications utilized by the UE, and/or the like.

As further shown in FIG. 5, process 500 may include determining a total score associated with utilizing a long duration PUCCH format for uplink control information based on the uplink data and the tuning factors (block 530). For example, the base station may determine a total score associated with utilizing the long duration PUCCH format for uplink control information, as described above. The long duration PUCCH format may include a first format that includes one or two bits of the uplink control information and one physical resource block, a second format that includes more than two bits of the uplink control information and one or more physical resource blocks, or a third format that includes more than two bits of the uplink control information and one physical resource block.

In some implementations, the base station assigns scores to the uplink performance indicators and/or the tuning factors to generate a plurality of scores. The base station may apply weights to the plurality of scores to generate a plurality of weighted scores. In some implementations, the base station applies the weights to the plurality of scores based on the tuning factors. The base station may combine the plurality of weighted scores to determine the total score.

Alternatively, and/or additionally, the base station may utilize a machine learning model to determine the total score. For example, the base station may process the uplink data and the tuning factors, with a decision tree machine learning model, to determine the total score associated with utilizing the long duration PUCCH format for uplink control information.

As further shown in FIG. 5, process 500 may include determining whether the total score satisfies a threshold score (block 540). For example, the base station may determine whether the total score satisfies a threshold score, as described above. In some implementations, the base station may determine whether the total score and/or a set of factors satisfies one or more criteria. The set of factors may include one or more tuning factors, one or more characteristics associated with a UE, one or more transmission characteristics associated with a UE, and/or the like. For example, the base station may determine whether the total score satisfies a threshold selected from a plurality of thresholds based on a distance between a UE and the base station, an RF condition associated with a UE, and/or the like.

As further shown in FIG. 5, process 500 may include switching to the long duration PUCCH format for the uplink control information based on the total score satisfying the threshold score (block 550). For example, the base station may switch to the long duration PUCCH format for the uplink control information based on the total score satisfying the threshold score, as described above. The base station may maintain a short duration PUCCH format for the uplink control information based on the total score failing to satisfy the threshold score.

As further shown in FIG. 5, process 500 may include performing one or more actions based on switching to the long duration PUCCH format for the uplink control information (block 560). For example, the base station may perform one or more actions based on switching to the long duration PUCCH format for the uplink control information, as described above. In some implementations, the one or more actions include causing one or more of the UE to utilize the long duration PUCCH format. For example, the base station may select the long duration PUCCH format from a plurality of long duration PUCCH formats and may cause one or more of the UE to utilize the selected long duration PUCCH format. In some implementations, the base station may identify the one or more UE based on a distance between the one or more UE and the base station and/or based on RF conditions of the one or more UE. In some implementations, the base station may cause at least another one of the UE to continue to utilize the short duration PUCCH format.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a base station, uplink data identifying uplink performance indicators associated with user equipment connected to the base station;

receiving, by the base station, tuning factors associated with shared channel traffic received by the user equipment and receiving quality of service requirements of the user equipment;

determining, by the base station, a total score associated with utilizing a long duration physical uplink control channel (PUCCH) format for uplink control information based on the uplink data and the tuning factors;

determining, by the base station, whether the total score satisfies a threshold score;

switching, by the base station, to the long duration PUCCH format for the uplink control information based on the total score satisfying the threshold score; and performing, by the base station, one or more actions based on switching to the long duration PUCCH format for the uplink control information.

2. The method of claim 1, further comprising:

maintaining a short duration PUCCH format for the uplink control information based on the total score failing to satisfy the threshold score.

3. The method of claim 1, wherein the uplink performance indicators include one or more of:

error rates associated with the user equipment, a quantity of the user equipment associated with errors, or a quantity of the user equipment with high mobility rates.

4. The method of claim 1, wherein the tuning factors are further associated with one or more of:

distances between the user equipment and the base station, radio frequency conditions of the user equipment, service types of the user equipment, or applications utilized by the user equipment.

5. The method of claim 1, wherein the long duration PUCCH format includes one of:

a first format that includes one bit of the uplink control information and one physical resource block, a second format that includes more than two bits of the uplink control information and a plurality of physical resource blocks, or a third format that includes more than two bits of the uplink control information and one physical resource block.

6. The method of claim 1, wherein determining the total score comprises:

assigning scores to the uplink performance indicators and the tuning factors to generate a plurality of scores; and determining the total score based on the plurality of scores.

7. The method of claim 1, wherein determining the total score associated with utilizing the long duration PUCCH format for the uplink control information includes:

processing the uplink data and the tuning factors, with a machine learning model, to determine the total score associated with utilizing the long duration PUCCH format for the uplink control information, wherein the machine learning model includes a decision tree machine learning model.

8. A base station, comprising:
one or more processors configured to:
receive uplink data identifying uplink performance indicators associated with user equipment connected to the base station;
receive tuning factors associated with shared channel traffic received by the user equipment and quality of service requirements of the user equipment;
determine a total score associated with utilizing a long duration physical uplink control channel (PUCCH) format for uplink control information based on the uplink data and the tuning factors;
determine whether the total score satisfies a threshold score;
maintain a short duration PUCCH format for the uplink control information based on the total score failing to satisfy the threshold score;
switch to the long duration PUCCH format for the uplink control information based on the total score satisfying the threshold score; and
perform one or more actions based on switching to the long duration PUCCH format for the uplink control information.

9. The base station of claim 8, wherein, when determining the total score, the one or more processors are configured to:
assign scores to the uplink performance indicators and the tuning factors to generate a plurality of scores;
apply weights to the plurality of scores to generate a plurality of weighted scores; and
combine the plurality of weighted scores to determine the total score.

10. The base station of claim 8, wherein, when determining the total score, the one or more processors are configured to:
assign scores to the uplink performance indicators to generate a plurality of scores;
apply weights, based on the tuning factors, to the plurality of scores to generate a plurality of weighted scores; and
combine the plurality of weighted scores to determine the total score.

11. The base station of claim 8, wherein the one or more processors, when performing the one or more actions, are configured to:
cause one or more of the user equipment to utilize the long duration PUCCH format.

12. The base station of claim 8, wherein the one or more processors, when performing the one or more actions, are configured to:
select the long duration PUCCH format from a plurality of long duration PUCCH formats; and
cause one or more of the user equipment to utilize the selected long duration PUCCH format.

13. The base station of claim 8, wherein the one or more processors, when performing the one or more actions, are configured to:
cause at least one of the user equipment to utilize the long duration PUCCH format; and
cause at least another one of the user equipment to continue to utilize the short duration PUCCH format.

14. The base station of claim 8, wherein the one or more processors, when performing the one or more actions, are configured to:
identify a particular user equipment, of the user equipment, based on a distance between the particular user equipment and the base station or based on radio frequency conditions of the particular user equipment; and
cause the particular user equipment to utilize the long duration PUCCH format.

15. A non-transitory computer-readable medium storing a set of instructions, the set of instructions comprising:
one or more instructions that, when executed by one or more processors of a base station, cause the base station to:
receive uplink data identifying uplink performance indicators associated with user equipment connected to the base station,
wherein the uplink performance indicators include one or more of:
error rates associated with the user equipment,
a quantity of the user equipment associated with errors, or
a quantity of the user equipment with high mobility rates;
process the uplink data, with a machine learning model, to determine a total score associated with utilizing a long duration physical uplink control channel (PUCCH) format for uplink control information;
determine whether the total score satisfies a threshold score;
switch to the long duration PUCCH format for the uplink control information based on the total score satisfying the threshold score; and
perform one or more actions based on switching to the long duration PUCCH format for the uplink control information.

16. The non-transitory computer-readable medium of claim 15, wherein the one or more instructions further cause the base station to:
maintain a short duration PUCCH format for the uplink control information based on the total score failing to satisfy the threshold score.

17. The non-transitory computer-readable medium of claim 15, wherein the one or more instructions, that cause the base station to process the uplink data, with the machine learning model, to determine the total score, cause the base station to:
receive tuning factors associated with shared channel traffic received by the user equipment and quality of service requirements of the user equipment;
assign scores to the tuning factors to generate a plurality of scores;
apply weights to the plurality of scores to generate a plurality of weighted scores; and
combine the plurality of weighted scores to determine the total score.

18. The non-transitory computer-readable medium of claim 15, wherein the one or more instructions, that cause the base station to perform the one or more actions, cause the base station to one or more of:
cause one or more of the user equipment to utilize the long duration PUCCH format; or
retrain the machine learning model based on switching to the long duration PUCCH format.

19. The non-transitory computer-readable medium of claim 15, wherein the one or more instructions, that cause the base station to perform the one or more actions, cause the base station to:
select the long duration PUCCH format from a plurality of long duration PUCCH formats; and
cause one or more of the user equipment to utilize the selected long duration PUCCH format.

20. The non-transitory computer-readable medium of claim 15, wherein the one or more instructions, that cause the base station to perform the one or more actions, cause the base station to:
   identify a particular user equipment, of the user equipment, based on a distance between the particular user equipment and the base station or based on radio frequency conditions of the particular user equipment; and
   cause the particular user equipment to utilize the long duration PUCCH format.

* * * * *